(12) United States Patent
Bay et al.

(10) Patent No.: US 7,048,527 B2
(45) Date of Patent: May 23, 2006

(54) APPARATUS FOR CAPPING WIDE WEB RECLOSABLE FASTENERS

(75) Inventors: Randy S. Bay, Woodbury, MN (US); Cristina U. Thomas, Woodbury, MN (US); David F. Slama, Vadnais Heights, MN (US); Richard T. Paxton, Ames, IA (US); Gary L. Curtis, River Falls, WI (US); Jonathan J. Mattson, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 11/009,904

(22) Filed: Dec. 10, 2004

(65) Prior Publication Data

US 2005/0100626 A1    May 12, 2005

Related U.S. Application Data

(62) Division of application No. 10/002,560, filed on Nov. 1, 2001, now Pat. No. 6,843,944.

(51) Int. Cl.
*B29C 43/46* (2006.01)

(52) U.S. Cl. ............... 425/149; 425/363; 425/367

(58) Field of Classification Search ............ 425/149, 425/335, 363, 367
See application file for complete search history.

(56) References Cited

U.S. PATENT DOCUMENTS

| | | | |
|---|---|---|---|
| 1,161,620 A | 11/1915 | Coulter | |
| 1,192,709 A | 7/1916 | Tone | |
| 1,247,337 A | 11/1917 | Saunders et al. | |
| 1,268,533 A | 6/1918 | Allen | |
| 2,424,645 A | 7/1947 | Baumann, Jr. et al. | |
| 3,781,172 A | 12/1973 | Pett et al. | |
| 3,891,408 A | 6/1975 | Rowse et al. | |
| 3,893,826 A | 7/1975 | Quinan et al. | |
| 4,126,429 A | 11/1978 | Watson | |
| 4,214,857 A * | 7/1980 | Woeckener et al. | ......... 425/149 |
| 4,311,489 A | 1/1982 | Kressner | |
| 4,314,827 A | 2/1982 | Leitheiser et al. | |
| 4,457,767 A | 7/1984 | Poon et al. | |
| 4,518,397 A | 5/1985 | Leitheiser et al. | |
| 4,543,107 A | 9/1985 | Rue | |
| 4,588,419 A | 5/1986 | Caul et al. | |
| 4,623,364 A | 11/1986 | Cottringer et al. | |
| 4,652,275 A | 3/1987 | Bloecher et al. | |
| 4,734,104 A | 3/1988 | Broberg | |

(Continued)

FOREIGN PATENT DOCUMENTS

EP    0 771 537 A2    5/1997

(Continued)

*Primary Examiner*—James P. Mackey
(74) *Attorney, Agent, or Firm*—Pamela L. Stewart

(57) ABSTRACT

An apparatus for capping a stem web including a cooled roll, a first heated nip roll positioned to form a first nip with the cooled roll, and a second heated nip roll positioned to form a second nip with the cooled roll. The cooled roll has a diameter that is at least 30% larger than a diameter of the first or second heated nip roll. In an embodiment, the two nips are on opposite sides of a larger central cooled roll positioned between the heated rolls. In an embodiment, the reaction forces between the rolls are measured and controlled at each end of each of the heated rolls. The invention is particularly adapted to making abrasive particles that are attached to a driving mechanism via headed stem fasteners formed by the method.

6 Claims, 2 Drawing Sheets

U.S. PATENT DOCUMENTS

| | | |
|---|---|---|
| 4,737,163 A | 4/1988 | Larkey |
| 4,741,743 A | 5/1988 | Narayanan et al. |
| 4,744,802 A | 5/1988 | Schwabel |
| 4,751,138 A | 6/1988 | Tumey et al. |
| 4,770,671 A | 9/1988 | Monroe et al. |
| 4,799,939 A | 1/1989 | Bloecher et al. |
| 4,800,685 A | 1/1989 | Haynes, Jr. |
| 4,881,951 A | 11/1989 | Monroe et al. |
| 4,898,597 A | 2/1990 | Hay et al. |
| 4,997,461 A | 3/1991 | Markhoff-Matheny et al. |
| 5,011,508 A | 4/1991 | Wald et al. |
| 5,023,212 A | 6/1991 | Dubots et al. |
| 5,037,453 A | 8/1991 | Narayanan et al. |
| 5,090,968 A | 2/1992 | Pellow |
| 5,110,322 A | 5/1992 | Narayanan et al. |
| 5,139,978 A | 8/1992 | Wood |
| 5,143,522 A | 9/1992 | Gibson et al. |
| 5,152,917 A | 10/1992 | Pieper et al. |
| 5,201,916 A | 4/1993 | Berg et al. |
| 5,203,884 A | 4/1993 | Buchanan et al. |
| 5,227,104 A | 7/1993 | Bauer |
| 5,259,147 A | 11/1993 | Falz et al. |
| 5,263,840 A * | 11/1993 | Heitmann et al. .......... 425/367 |
| 5,336,280 A | 8/1994 | Dubots et al. |
| 5,366,523 A | 11/1994 | Rowenhorst et al. |
| 5,378,251 A | 1/1995 | Culler et al. |
| 5,417,726 A | 5/1995 | Stout et al. |
| 5,429,647 A | 7/1995 | Larmie |
| 5,436,063 A | 7/1995 | Follett et al. |
| 5,496,386 A | 3/1996 | Brobert et al. |
| 5,498,269 A | 3/1996 | Larmie |
| 5,520,711 A | 5/1996 | Helmin |
| 5,549,962 A | 8/1996 | Holmes et al. |
| 5,551,963 A | 9/1996 | Larmie |
| 5,593,467 A | 1/1997 | Monroe |
| 5,607,635 A | 3/1997 | Melbye et al. |
| 5,609,706 A | 3/1997 | Benedict et al. |
| 5,665,127 A | 9/1997 | Möltgen |
| 5,679,302 A | 10/1997 | Miller et al. |
| 5,749,129 A | 5/1998 | Murasaki et al. |
| 5,792,408 A | 8/1998 | Akeno et al. |
| 5,863,308 A | 1/1999 | Qi et al. |
| 5,868,987 A | 2/1999 | Kampfer et al. |
| 5,945,131 A * | 8/1999 | Harvey et al. .............. 425/149 |
| 5,954,844 A | 9/1999 | Law et al. |
| 5,961,674 A | 10/1999 | Gagliardi et al. |
| 5,975,988 A | 11/1999 | Christianson |
| 6,000,106 A | 12/1999 | Kampfer et al. |
| 6,039,911 A | 3/2000 | Miller et al. |
| 6,054,091 A | 4/2000 | Miller et al. |
| 6,132,660 A | 10/2000 | Kampfer |
| 6,197,076 B1 | 3/2001 | Braunschweig et al. |
| 6,248,276 B1 | 6/2001 | Parellada et al. |
| 6,280,670 B1 | 8/2001 | Buzzell et al. |
| 6,451,077 B1 | 9/2002 | Rosenflanz |
| 6,454,822 B1 | 9/2002 | Rosenflanz |
| 6,458,731 B1 | 10/2002 | Rosenflanz |
| 6,521,004 B1 | 2/2003 | Culler et al. |
| 6,569,374 B1 | 5/2003 | Poulakis |
| 6,579,162 B1 | 6/2003 | Chesley et al. |
| 6,582,488 B1 | 6/2003 | Rosenflanz |
| 6,582,642 B1 | 6/2003 | Buzzell et al. |
| 6,583,080 B1 | 6/2003 | Rosenflanz |
| 6,589,305 B1 | 7/2003 | Rosenflanz |
| 6,592,640 B1 | 7/2003 | Rosenflanz et al. |
| 6,596,041 B1 | 7/2003 | Rosenflanz |
| 6,607,570 B1 | 8/2003 | Rosenflanz et al. |
| 6,627,133 B1 | 9/2003 | Tuma |
| 6,660,121 B1 | 12/2003 | Harvey et al. |
| 6,666,750 B1 | 12/2003 | Rosenflanz |
| 6,669,749 B1 | 12/2003 | Rosenflanz et al. |
| 6,706,083 B1 | 3/2004 | Rosenflanz |
| 2001/0000365 A1 | 4/2001 | Provost et al. |

FOREIGN PATENT DOCUMENTS

| | | |
|---|---|---|
| EP | 0 811 332 A2 | 12/1997 |
| WO | WO 00/59685 * | 10/2000 |
| WO | WO 01/24654 A1 | 4/2001 |

* cited by examiner

APPARATUS FOR CAPPING WIDE WEB RECLOSABLE FASTENERS

CROSS REFERENCE TO RELATED APPLICATIONS

This application is a divisional of U.S. Ser. No. 10/002560, filed Nov. 1, 2001, now U.S. Pat. No. 6,843,944; the disclosure of which is herein incorporated by reference.

TECHNICAL FIELD

The present invention is directed to a method and apparatus for capping headed stem releasable fastening webs, and more particularly, to a method and apparatus that can cap the stems when the width of the web is great.

BACKGROUND OF THE INVENTION

Releasable mechanical fasteners are widely used for a vast array of products and applications. One class of such fasteners is the hook-and-loop variety, which include one part having multiple hook shaped projections, and another part presenting a large number of loose loops of fabric or fiber intended to snag on the hooks. Such fasteners have found particular success in e.g. garment manufacturing, and are commercially available under e.g. the Velcro™ brand-name from the Velcro USA Inc and under the SCOTCH-MATE brand-name from Minnesota Mining & Manufacturing Co. of St. Paul. More recently releasable fasteners that are self-mating, e.g. where both parts of the fastener are identically constructed and mutually interengage, have become available. One such example is the Dual Lock™ reclosable fasteners commercially available from Minnesota Mining & Manufacturing Co. of St. Paul, Minn. Both types of reclosable fasteners can be fabricated by preparing a web having projecting stems thereon (herein referred to as "stem web") and then capping those stems to form an array of shaped projections. The stem webs typically have an indefinite length and given width. The capping of the stems is done against a heated roll as described in U.S. Pat. No. 5,679,302, the entire contents of which are hereby incorporated by reference. A limitation with this process is that the gap between the rolls must be precisely controlled in order to maintain the final thickness of the product and the size of the caps. Another limitation is that the process is only suitable for relatively lower line speeds.

A more recent development in capping processes for stem webs was the invention of a continuously tapered nip or capping shoe. Such an apparatus is described in U.S. Pat. No. 6,039,911, the entire disclosure of which is hereby incorporated by reference. The main advantage of this design is that more contact with the heated roll allows the process to be run at higher line speeds. However, it was found that difficulties were encountered when extrapolating the method to wider web widths. The method involves a variable nip, and the exact dimension of the gap at that nip is very important. At wider web widths, roll deflection due to mechanical bending or non-uniform temperatures makes it difficult to achieve a gap that has a uniform dimension across the entire roll. This can be partially balanced with larger roll diameters, but that leads to other problems with weight, cost and thermal control.

More recently then, expedients adapted from roll processes used for the calendering of paper, plastic and magnetic media have been used for the making of self mating fasteners. These processes stack several rolls together so that there are loads on both sides of most of the rolls. In this process the capping is accomplished in a series of incremental steps, which lowers the peak force required in each step and lowers the amount of roll deflection.

FIG. 1a shows a conventional calendering process for capping stem webs. In FIG. 1a, the stem web 10, having a backing 12 and stems 14 thereon, is maneuvered over idler 16 and directed into a nip between heated roll 20 and cooled roll 24. The stem web 10 is then directed through a second nip 28 between cooled roll 24 and heated roll 30. The stem web 10 then passes through a third nip 32 between heated roll 30 and cooled roll 34, and then a fourth nip 36 between cooled roll 34 and heated roll 38. The stem when 10 is then directed to a fifth nip 40 between heated roll 38 and cooled roll 42. At last, the stem web 10 is directed to a sixth nip 44 between cooled roll 42 and heated roll 46. At last, the fully capped web 48 is then drawn off. It should be noted that because heated roll 20 at the top and heated roll 46 on the bottom are loaded on only one side, they have a larger diameter to minimize deflection. This process has been successfully used to fabricate HookIt II brand abrasive sanding disks commercially available from Minnesota Mining & Manufacturing Co. of St. Paul, Minn.

Referring now to FIG. 1b, a detail side view of a portion of fully capped stem web 48 according to conventional processes requiring three or more nips to finally cap the stem web. The figure is used to define reference dimensions for capped stem webs. In this view, one stem 14 is seen in isolation, extending from backing 12 and having a diameter "d". The use of conventional processes, such as that disclosed in FIG. 1a, has stem 14, forming cap 50, resulting in capped stem 52. The cap 50 has a diameter "D". A convenient way of expressing the degree of capping achieved is the ratio of D:d. For the Hook-it™ II product, a D:d ratio of approximately 1.66 is achieved at the end of the process, and this ratio is found to give the desired strength of the bond with loop material. The method results in capped stems 52 having a good symmetrical shape without buckling, and a consistent result across the width of the capped web 48 if the web width is less than 1 meter and the line speed is less than about 30 m/minute. However, the complexity of this mechanism, and the difficulty of properly gauging six distinct but interacting nips have proven to have disadvantages. Also, the process is proved to be unwarrantedly difficult when attempting to extrapolate to larger diameter stems and faster line speeds. But simpler methods have proved elusive; for example, with the process according to FIG. 1a, D:d ratios of only about 1.44 being achievable at second nip 28. The art still requires a method for capping stem webs that is simple, usable with wider web widths, and capable of running at higher web speeds even when processing stem webs with stems of greater diameter.

SUMMARY OF THE INVENTION

The present invention permits stem web to be prepared in greater width at greater line speed than has previously been possible. It accomplishes this by recognizing that the problem of introducing enough heat energy to the tops of the stems so that they can be deformed is not always the most vital. As line speeds and stem diameters increase it becomes more and more difficult to remove enough heat energy from the stems so that they will not be deformed on the next capping pass. The methods and embodiments of the present invention emphasize the importance of sufficient and timely cooling. In one aspect, the invention provides a method for capping a stem web, a stem web being a material having a backing and a plurality of stems having a diameter "d" extending from that backing. The method includes passing the stem web through a first nip against a first heated nip roll so as to partially cap the stems; cooling the web; and passing the stem web through a second nip against a second heated nip roll to completely cap the stems to a diameter "D". The ratio of D:d is at least 1.5:1, and preferably at least 1.65:1. In preferred embodiments, during the passing steps the stem web is moved at a line speed of at least 30 m/minute.

In less technical terms, the partially capped stem web is cooled so well and so fast that the stems that were warm and weak after passing through the first nip regain their strength before being subjected to a second nip. With their strength restored, the second nip can finish the job of capping which up until the present invention had to be done in multiple passes for fear of collapsing the stems.

An alternative way of expressing the present invention is that it provides a method for capping a stem web, said stem web having a backing and a plurality of stems having a diameter "d" extending from the backing, the method comprising:

passing the stem web through a first nip so as to partially cap the stems;

cooling the stem web; and passing the stem web through a second nip to completely cap the stems to a diameter "D", wherein the ratio of D:d is at least 1.5:1.

Preferably, the cooling step is performed by contacting the stem web against a cooled roll, and more preferably the first nip is between a first heated nip roll and the cooled roll. Also preferably, the second nip is between a second heated nip roll and the cooled roll. Conveniently, the stem web contacts the cooled roll for at least 20% of its circumference so that the requisite amount of cooling can be accomplished. In some preferred embodiments the stem web contacts the cooled roll for at least 25%, or even 30% of its circumference. In order to accommodate these preferences, it is particularly convenient that the diameter of the cooled roll is at least 30% larger than the diameter of the first nip roll, and also that the diameter of the cooled roll is at least 30% larger than the diameter of the second heated nip roll.

In cases where both nips are against a single cooled roll, it is currently considered preferred that the forces between the first heated nip roll and the cooled roll, and the forces between the second heated nip roll and the cooled roll, are measured at both ends of each roll. These measurements are then used to adjust the positions of the rolls. In most circumstances, these adjustments act so as to equalize the four reaction forces acting between the rolls at the four measurement locations. This expedient is one of several things that are included in preferred embodiments so that wide stem webs may be capped with a very consistent result across their entire width. In particular, it is highly desirable that the capping operation is carried out without bending or buckling the stems. Caps that are symmetrical about the axis of the stem and not bent over relative to the surface of the backing usually provide better results in most applications where headed stem fasteners are required. Processes that would bend the stems during the capping operation by more than 4 degrees from perpendicular to the plane of the backing are less desirable. The method of the present invention can exceed this criterion even when the width of the stem web is over 1 meter, and when the line speed is at least 30 m/minute.

In this aspect, the present invention can be considered as an apparatus for capping a stem web. This apparatus has a cooled roll, a first heated nip roll positioned to form a first nip with the cooled roll, and a second heated nip roll positioned to form a second nip with the cooled roll. It has sensors for measuring the forces between the first heated nip roll and the cooled roll, and the forces between the second heated nip roll and the cooled roll, at both ends of each roll. It also has actuators for adjusting the positions of the rolls based on the output of the sensors.

One application for which the present invention is particularly suited is the making of self-mating abrasive articles, and such articles themselves. In the abrading art, a perennial problem is the attachment of an abrasive article to some mechanism which provides relative motion against a workpiece. Such mechanisms include, e.g. rotary or orbital sanders. Clamps or adhesives are traditional expedients for releasably attaching an abrasive article, e.g. sandpaper to the mechanism. Self-mating connection systems have been considered in this context, but the high shear forces involved in sanding and grinding have heretofore been a limitation. But the thick-stemmed stem webs that the present invention can consistently cap, even in the widths necessary for economical high-volume commercial production of abrasives, defy this limitation.

Therefore, in another aspect, the present invention provides a method for making an abrasive article, the method comprising:

providing stem web comprising a backing having a first and second, opposite major surfaces, and a plurality of stems having a diameter "d" extending from at least a portion of the first major surface of the backing;

passing the stem web through a first nip against a first heated nip roll so as to partially cap the stems;

cooling the web;

passing the stem web through a second nip against a second heated nip roll to completely cap the stems to a diameter "D", wherein the ratio of D:d is at least 1.5:1; and applying an abrasive layer onto at least a portion of the second major surface.

In some preferred embodiments, the abrasive layer is applied by applying a make coat onto at least a portion of the second major surface of the backing; at least partially embedding abrasive particles in the make coat; at least partially curing the make coat; applying a size coat over at least a portion of the at least partially cured make coat and abrasive particles; and curing the size coat. The abrasive layer may be applied onto at least a portion of the second major surface prior to passing the stem web through the second nip, or it may be applied after passing the stem web through the second nip.

In analogy with the methods described above, when making the abrasive article is presently considered preferred to use two heated rollers each providing a capping nip against a larger cooled roll between them. It is considered particularly preferred to measure the forces between the first heated nip roll and the cooled roll, and the forces between the second heated nip roll and the cooled roll, at both ends of each roll, and to use these measurements to adjust the positions of the rolls.

BRIEF DESCRIPTION OF THE DRAWINGS

FIG. 1b is a detail side view of a capped stem according to the known process illustrated in FIG. 1a;

DETAILED DESCRIPTION

Figure 1A:
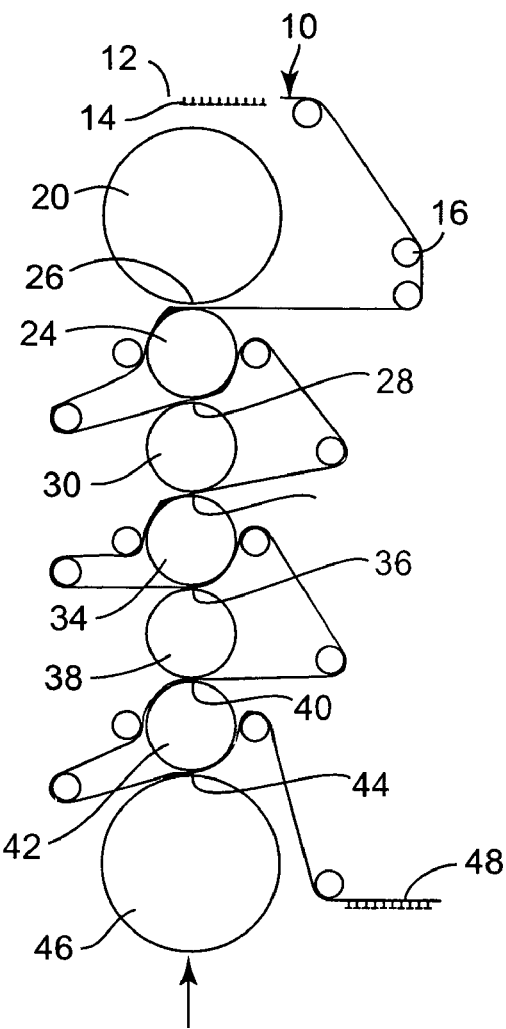
FIG. 1a is a schematic view of a known process for capping stem webs.
Figure 1B:
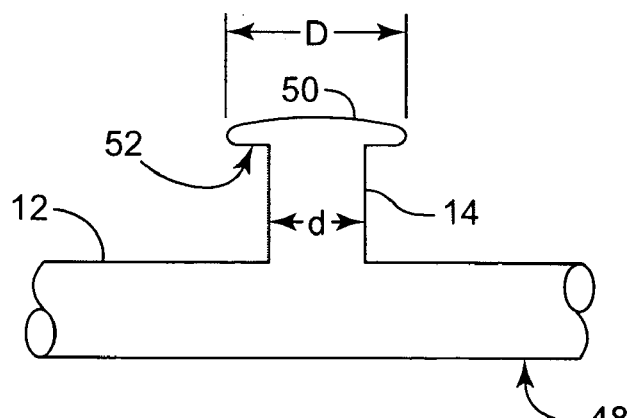
Figure 2:
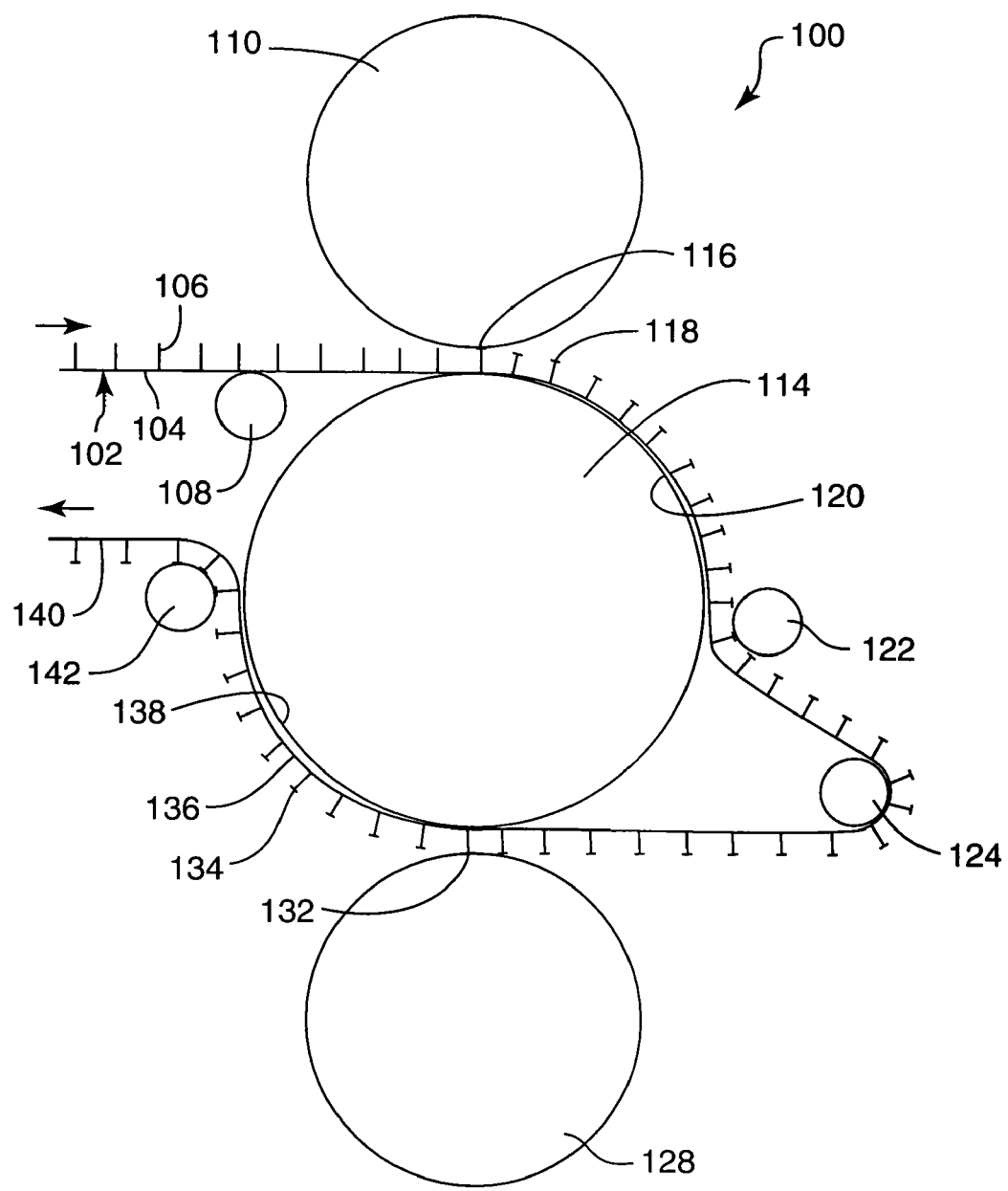
FIG. 2 is a schematic view of a process according to the present invention for capping stem webs.

Referring now to FIG. 2, an exemplary the apparatus 100 according to the present invention is illustrated. In this Figure, the stem web 102, having a backing 104 and stems 106 thereon, is maneuvered over idlers 108 and into contact with a heated roll 110. The stem web 102 is nipped between first heated roll 110 and cooled roll 114. Within this nip 116, the stems 106 are deformed so as to provide partial caps 118. It is to be noted that after emerging from nip 116, the stem web 102 remains in contact with cooled roll 114 in a region 120 which is preferably at least 20%, more preferably at least 25%, and even more preferably 30% of the circumference of cooled roll 114. It has been observed in the development of the present invention that under certain conditions the rate of cooling becomes a limiting factor. Therefore, in preferred embodiments the cooled roll is deliberately larger than the heated rolls so that it has more thermal mass for the removal of heat from the stem web 102, and so that a given percent of the circumference is great in absolute terms as well as relative terms.

After passing to the cooling region 120, the stem web 102 is taken off and reoriented by idlers 122 and 124. The stem web 102 is then nipped between the second heated roll 128 and the cooled roll 114. The gap in this nip 132 is gauged so as to form caps 134 of finished size in diameter. After passing to the nip 132 the capped web 136 is once again cooled against the cooled roll 114 in a region 138. As before, in preferred embodiments region 138 is preferably at least 20%, and more preferably at least 25% of the circumference of the cooled roll 114. It has been found in connection with the present invention that is possible to do a significant amount of deformation in only two passes because during the intense cooling performed in region 120 the stems have a chance to regain their structural integrity. The capped stems 134 also regain strength in region 138 so that the capped stem web 140 can be taken off around idler 142. The rolls 110, 114, and 128 are conveniently fabricated from materials, such as for example stainless-steel, so as to provide a substantial thermal mass and minimize temperature fluctuations. The heated rolls 110 and 128 are conveniently heated by electrical heaters on their inside surfaces, or the alternative by hot water or oil circulating through internal passages. The cooled roll is most conveniently cooled by means of a cold water circulation system in ways well understood by the ordinary artisan. One advantage of apparatus 100 is that it can utilize rolls 110, 114, and 128 having nominal widths of 1 meter or greater. Additionally, the wide rolls can be used at processing line speeds of greater than 34 m/minute.

Those skilled in the art recognize that the inventive aspect of the present method may be practiced utilizing equipment other than rolls to provide a nip. For example, rotating belts may be incorporated to form the nip. Additionally, the nip profile may change depending on the material of the stem web and the specific cap desired. Those skilled in the art of stem web capping are capable of providing nip profiles to obtain a desired end product.

The apparatus 100 is suitable for use with different stem web 102 of diverse materials and dimensions. Stem web is conveniently made from a variety of materials as described in U.S. Pat. No. 5,679,302, previously incorporated by reference. For example, a copolymer of polypropylene and polyethylene containing 17.5% polyethylene and having a melt index of 30, commercially available as SRD7–560 from Union Carbide Co. of Seadrift, Tex., is considered particularly suitable. The preparation of stem web suitable as input material for the capping operation can be done in several ways, one of which is described in U.S. Pat. No. 5,679,302 in connection with e.g. FIG. 6A in that document.

The present invention cools the heated stem web to a point where the material regains some of its original strength, or structural integrity, prior to being subjected to the second nip. By regaining a level of structural integrity in the stem web, the deformation at the second nip primarily occurs at the partially capped area of the stem and not at the stem itself. One way of measuring structural integrity is through the elastic modulus of the material. In the present invention, the cooling of the stem web increases the elastic modulus from the initial capping step to prevent deformation of the stem during the second nip. Preferably, the elastic modulus of the stem web is increased to a level of at least 14 times greater than the elastic modulus of the stem web at a reference temperature essentially equal to the surface temperature at the second nip. Another approach for measuring structural integrity is through the yield stress of the material. Similar to the elastic modulus, yield stress increases as temperature decreases. In the present invention, it is preferred that the yield stress of the stem web at the cooling step increases to a level of at least 105 times that of the yield stress of the stem web at a reference temperature essentially equal to a surface temperature at the second nip.

In preparing the stem web for use with the present invention, the thickness of the backing 104 is conveniently between 4 mils (0.1 mm) and 10 mils (0.25 mm), and depending on end use, stems 106 can be formed on the backing in densities ranging from 100 to 3000 stems per square inch (15 to 465 stems/cm$^2$). Stem diameters ranging from 0.005 to 0.020 inches and stem heights ranging from 0.003 to 0.070 inches are considered particularly convenient, with the exact values dependent on the intended end use. These stems are conveniently round cylinders, but square, oval, or other cross-sections are workable and desirable for specialized applications.

The capping of the stem web is generally a time-temperature-pressure Phenomenon. Thus specific cap shapes or designs may be altered, or affected, by selecting specific time, temperature, or pressure parameters at the nipping stage for a given process and selected stem web materials. For example, U.S. Pat. No. 6,039,911, herein incorporated by reference in its entirety, discloses a method and several devices for varying the nip length and pressure. Additionally, it is generally recognized that the relative line speed of the surface of the nipping device and of the stem web impact the shape of the cap. Those skilled in the art are capable of incorporating the cooling step of the present invention with conventional nipping processes and selected stem web materials to obtain a capped stem web with a desired cap size and shape.

In preferred embodiments, the forces between the first heated roll 110 and the cooled roll 114, and the forces between the second heated nip roll 128 and the cooled roll, are measured at both ends of each roll. The measurements are conveniently made with the use hydraulic actuators with embedded force and position measurements such as the PSC Cylinder commercially available from Miller Fluid Power of Bensenville, Ill. It will be known by those skilled in the art of such devices how to appropriately select these devices for the specific material, process conditions and equipment size being used.

Figure 3:
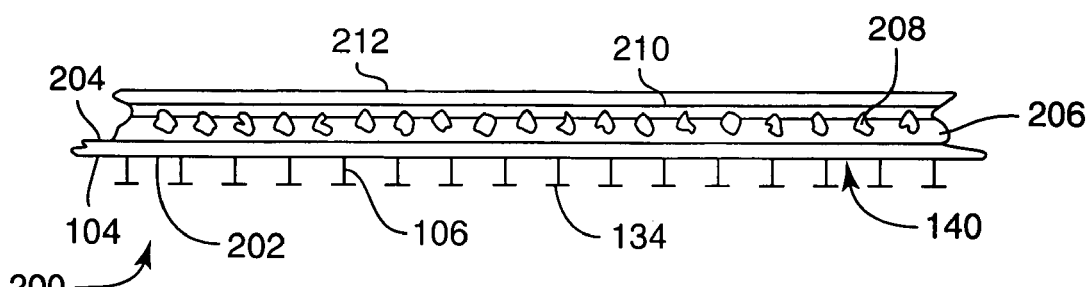
FIG. 3 is a side view on a representative abrasive article prepared according to the present invention.

Referring now to FIG. 3, a side view on a representative abrasive article 200, prepared according to the present invention is illustrated. The side of the capped stem web 140 bearing the stems can be called a first major surface 202. The abrasive article 200 has then on a second major surface 204 opposite the first major surface 202, the make coat 206. At least partially embedded in the make coat 206 are abrasive particles 208. A size coat 210 is conveniently applied over the abrasive particles. The abrasive article 200 is conveniently prepared by making the capped stem web 140 as described above and then applying a make coat 206 onto least a portion of the second major surface 204 of the backing 104. Abrasive particles 208 are then at least partially embedded in the make coat 206, and the make coat is then at least partially cured. A size coat 210 is applied over at least a portion of the at least partially cured make coat 206 and abrasive particles 208, and then the size coat is cured. An optional supersize coat 212 may be applied over the partially cured size coat 210.

Suitable materials for the make coat 206 include thermosetting organic polymers. Examples of suitable thermosetting organic polymers include phenolic resins, urea-formaldehyde resins, melamine-formaldehyde resins, urethane resins, acrylate resins, polyester resins, aminoplast resins having pendant $\alpha,\beta$-unsaturated carbonyl groups, epoxy resins, acrylated urethane, acrylated epoxies, and combinations thereof. The make coat 206, the abrasive article 200, or both may also include additives such as fibers, lubricants, wetting agents, thixotropic materials, surfactants, pigments, dyes, antistatic agents (e.g., carbon black, vanadium oxide, graphite, etc.), coupling agents (e.g., silanes, titanates, zircoaluminates, etc.), plasticizers, suspending agents, and the like. The amounts of these optional additives are selected to provide the desired properties. The coupling agents can improve adhesion to the abrasive particles and/or filler. The binder chemistry may be thermally cured, radiation cured or combinations thereof. Additional details on binder chemistry may be found in U.S. Pat. No. 4,588,419 (Caul et al.), U.S. Pat. No. 4,751,137 (Tumey et al.), and U.S. Pat. No. 5,436,063 (Follett et al.), the disclosures of which are incorporated herein by reference in their entirety.

The abrasive articles 200 can contain 100% abrasive particles 208 or blends of such abrasive particles with other abrasive particles and/or diluent particles. Examples of suitable conventional abrasive particles include fused aluminum oxide (including white fused alumina, heat-treated aluminum oxide and brown aluminum oxide), silicon carbide, boron carbide, titanium carbide, diamond, cubic boron nitride, garnet, fused alumina-zirconia, and sol-gel-derived abrasive particles, and the like. The sol-gel-derived abrasive particles may be seeded or non-seeded. Likewise, the sol-gel-derived abrasive particles may be randomly shaped or have a shape associated with them, such as a rod or a triangle. Examples of sol gel abrasive particles include those described U.S. Pat. Nos. 4,314,827 (Leitheiser et al.), U.S. Pat. No. 4,518,397 (Leitheiser et al.), U.S. Pat. No. 4,623,364 (Cottringer et al.), U.S. Pat. No. 4,744,802 (Schwabel), U.S. Pat. No. 4,770,671 (Monroe et al.), U.S. Pat. No. 4,881,951 (Wood et al.), U.S. Pat. No. 5,011,508 (Wald et al.), U.S. Pat. No. 5,090,968 (Pellow), U.S. Pat. No. 5,139,978 (Wood), U.S. Pat. No. 5,201,916 (Berg et al.), U.S. Pat. No. 5,227,104 (Bauer), U.S. Pat. No. 5,366,523 (Rowenhorst et al.), U.S. Pat. No. 5,429,647 (Larmie), U.S. Pat. No. 5,498,269 (Larmie), and U.S. Pat. 5,551,963 (Larmie), the disclosures of which are incorporated herein by reference in their entirety. Additional details concerning sintered alumina abrasive particles made by using alumina powders as a raw material source can also be found, for example, in U.S. Pat. Nos. 5,259,147 (Falz), U.S. Pat. No. 5,593,467 (Monroe), and U.S. Pat. No. 5,665,127 (Moltgen), the disclosures of which are incorporated herein by reference in their entirety. Additional details concerning fused abrasive particles, can be found, for example, in U.S. Pat. No. 1,161,620 (Coulter), U.S. Pat. No. 1,192,709 (Tone), U.S. Pat. No. 1,247,337 (Saunders et al.), U.S. Pat. No. 1,268,533 (Allen), and U.S. Pat. No. 2,424,645 (Baumann et al.) U.S. Pat. No. 3,891,408 (Rowse et al.), U.S. Pat. No. 3,781,172 (Pett et al.), U.S. Pat. No. 3,893,826 (Quinan et al.), U.S. Pat. No. 4,126,429 (Watson), U.S. Pat. No. 4,457,767 (Poon et al.), U.S. Pat. No. 5,023,212 (Dubots et. al), U.S. (Gibson et al.), and U.S. Pat. No. 5,336,280 (Dubots et. al), and applications having U.S. Ser. Nos. 09/495,978, 09/496,422, 09/496,638, and 09/496,713, each filed on Feb. 2, 2000, and, 09/618,876, 09/618,879, 09/619,106, 09/619,191, 09/619,192, 09/619,215, 09/619,289, 09/619,563, 09/619,729, 09/619,744, and 09/620,262, each filed on Jul. 19, 2000, and Ser. No. 09/772,730, filed Jan. 30, 2001, the disclosures of which are incorporated herein by reference in their entirety. In some instances, blends of abrasive particles may result in an abrasive article that exhibits improved grinding performance in comparison with abrasive articles comprising 100% of either type of abrasive particle.

If there is a blend of abrasive particles, the abrasive particle types forming the blend may be of the same size. Alternatively, the abrasive particle types may be of different particle sizes. Also, the abrasive particles may be uniformly distributed in the abrasive article or concentrated in selected areas or portions of the abrasive article. For example, in a coated abrasive, there may be two layers of abrasive particles.

Examples of suitable diluent particles include marble, gypsum, flint, silica, iron oxide, aluminum silicate, glass (including glass bubbles and glass beads), alumina bubbles, alumina beads and diluent agglomerates. Abrasive particles according to the present invention can also be combined in or with abrasive agglomerates. Abrasive agglomerate particles typically comprise a plurality of abrasive particles, a binder, and optional additives. The binder may be organic or inorganic. Abrasive agglomerates may be randomly shape or have a predetermined shape associated with them. The shape may be a block, cylinder, pyramid, coin, square, or the like. Abrasive agglomerate particles typically have particle sizes ranging from about 100 to about 5000 micrometers, typically about 250 to about 2500 micrometers. Additional details regarding abrasive agglomerate particles may be found, for example, in U.S. Pat. No. 4,311,489 (Kressner), U.S. Pat. No. 4,652,275 (Bloecher et al.), U.S. Pat. No. 4,799,939 (Bloecher et al.), U.S. Pat. No. 5,549,962 (Holmes et al.), and U.S. Pat. No. 5,975,988 (Christianson), and applications having U.S. Ser. Nos. 09/688,444 and 09/688,484, filed Oct. 16, 2000, the disclosures of which are incorporated herein by reference in their entirety.

Grinding aids can be particularly useful in coated abrasive articles. In coated abrasive articles, grinding aid is typically used in the supersize coat 212, which is applied over the surface of the abrasive particles. Sometimes, however, the grinding aid is added to the size coat 210. Typically, the amount of grinding aid incorporated into coated abrasive articles is about 50–300 g/m$^2$ (desirably, about 80–160 g/m$^2$).

Grinding aids encompass a wide variety of different materials and can be inorganic or organic based. Examples of chemical groups of grinding aids include waxes, organic halide compounds, halide salts and metals and their alloys.

The organic halide compounds will typically break down during abrading and release a halogen acid or a gaseous halide compound. Examples of such materials include chlorinated waxes like tetrachloronaphtalene, pentachloronaphthalene, and polyvinyl chloride. Examples of halide salts include sodium chloride, potassium cryolite, sodium cryolite, ammonium cryolite, potassium tetrafluoroboate, sodium tetrafluoroborate, silicon fluorides, potassium chloride, and magnesium chloride. Examples of metals include, tin, lead, bismuth, cobalt, antimony, cadmium, and iron titanium. Other miscellaneous grinding aids include sulfur, organic sulfur compounds, graphite, and metallic sulfides. It is also within the scope of the present invention to use a combination of different grinding aids, and in some instances this may produce a synergistic effect. The preferred grinding aid is cryolite; the most preferred grinding aid is potassium tetrafluoroborate.

Further details regarding coated abrasive articles can be found, for example, in U.S. Pat. No. 4,734,104 (Broberg), U.S. Pat. No. 4,737,163 (Larkey), U.S. Pat. No. 5,203,884 (Buchanan et al.), U.S. Pat. No. 5,152,917 (Pieper et al.), U.S. Pat. No. 5,378,251 (Culler et al.), U.S. Pat. No. 5,417,726 (Stout et al.), U.S. 5,436,063 (Follett et al.), U.S. Pat. No. 5,496,386 (Broberg et al.), U.S. Pat. No. 5,609,706 (Benedict et al.), U.S. Pat. No. 5,520,711 (Helmin), U.S. Pat. No. 5,954,844 (Law et al.), U.S. Pat. No. 5,961,674 (Gagliardi et al.), and U.S. Pat. No. 5,975,988 (Christinason), the disclosures of which are incorporated herein by reference. Further details regarding bonded abrasive articles can be found, for example, in U.S. Pat. No. 4,543,107 (Rue), U.S. Pat. No. 4,741,743 (Narayanan et al.), U.S. Pat. No. 4,800,685 (Haynes et al.), U.S. Pat. No. 4,898,597 (Hay et al.), U.S. Pat. No. 4,997,461 (Markhoff-Matheny et al.), U.S. Pat. No. 5,038,453 (Narayanan et al.), U.S. Pat. No. 5,110,332 (Narayanan et al.), and U.S. Pat. No. 5,863,308 (Qi et al.) the disclosures of which are incorporated herein by reference in their entirety.

From the above disclosure of the general principles of the present invention and the preceding detailed description, those skilled in this art will readily comprehend the various modifications to which the present invention is susceptible. Therefore, the scope of the invention should be limited only by the following claims and equivalents thereof.

What is claimed is:

1. An apparatus for capping a stem web, said stem web having a backing and a plurality of stems extending from the backing, the apparatus comprising:
    a cooled roll;
    a first heated nip roll positioned to form a first nip wit the cooled roll;
    a second heated nip roll positioned to form a second nip with the cooled roll, wherein the cooled roll has a diameter that is at least 30% larger than a diameter of the first heated nip roll;
    sensors for measuring forces between the first heated nip roll and the cooled roll, and forces between the second heated nip roll and the cooled roll, at both ends of each roll, and
    actuators for adjusting positions of the rolls based on the output of the sensors.

2. The apparatus according to claim 1, wherein the diameter of the cooled roll is at least 30% larger than a diameter of the second heated nip roll.

3. An apparatus for capping a stem web, said stem web having a backing and a plurality of stems extending from the backing, the apparatus comprising:
    a cooled roll;
    a first heated nip roll positioned to farm a first nip with the cooled roll;
    a second heated nip roll positioned to form a second nip with the cooled roll, wherein the cooled roll has a diameter that is at least 30% larger than a diameter of the first heated nip roll.

4. The apparatus of claim 3, further comprising sensors for measuring forces between the first heated nip roll and the cooled roll, and forces between the second heated nip roll and the cooled roll, at both ends of each roll.

5. The apparatus of claim 3, further comprising actuators for adjusting positions of the rolls based on the output of the sensors.

6. The apparatus of claim 3, wherein the diameter of the cooled roll is at least 30% larger than the diameter of the second heated nip roll.

* * * * *

UNITED STATES PATENT AND TRADEMARK OFFICE
CERTIFICATE OF CORRECTION

PATENT NO. : 7,048,527 B2
APPLICATION NO. : 11/009904
DATED : May 23, 2006
INVENTOR(S) : Randy S. Bay It is certified that error appears in the above-identified patent and that said Letters Patent is hereby corrected as shown below:

On Title Page 2 (item 56)
Column 1, line 8, References Cited, under U.S. PATENT DOCUMENTS, delete "Monroe et al." and insert -- Wood et al. --, therefor.
Column 2, line 20, References Cited, under U.S. PATENT DOCUMENTS, after "6,579,162" delete "B1" and insert -- B2 --, therefor.
Column 2, line 26, References Cited, under U.S. PATENT DOCUMENTS, after "6,596,041" delete "B1" and insert -- B2 --, therefor.
Column 2, line 29, References Cited, under U.S. PATENT DOCUMENTS, after "6,660,121" delete "B1" and insert -- B2 --, therefor.

Column 7
Line 55, delete "Nos." and insert -- No. --, therefor.

Column 8
Line 2, delete "Nos." and insert -- No. --, therefor.
Line 13, delete "(Dubots et. al),” and insert -- (Dubots et al.), --, therefor.
Line 13, before "(Gibson et al.)" delete "U.S." and insert -- U.S. Pat. No. 5,143,522 --, therefor.
Line 14, delete "(Dubots et. al)," and insert -- (Dubots et al.), --, therefor.

Column 9
Line 7, delete "tetrafluoroboate," and insert -- tetrafluoroborate, --, therefor.

UNITED STATES PATENT AND TRADEMARK OFFICE
CERTIFICATE OF CORRECTION

PATENT NO. : 7,048,527 B2
APPLICATION NO. : 11/009904
DATED : May 23, 2006
INVENTOR(S) : Randy S. Bay It is certified that error appears in the above-identified patent and that said Letters Patent is hereby corrected as shown below:

Column 10
Line 6, in Claim 1, delete "wit" and insert -- with --, therefor.
Line 25, in Claim 3, delete "farm" and insert -- form --, therefor.
Line 35, in Claim 5, delete "claim 3," and insert -- claim 4, --, therefor.

Signed and Sealed this

Tenth Day of October, 2006

JON W. DUDAS
*Director of the United States Patent and Trademark Office*